W. H. MORGAN.
RAILROAD TRACK CONSTRUCTION.
APPLICATION FILED MAY 13, 1913.
Reissued May 11, 1915. 13,917.
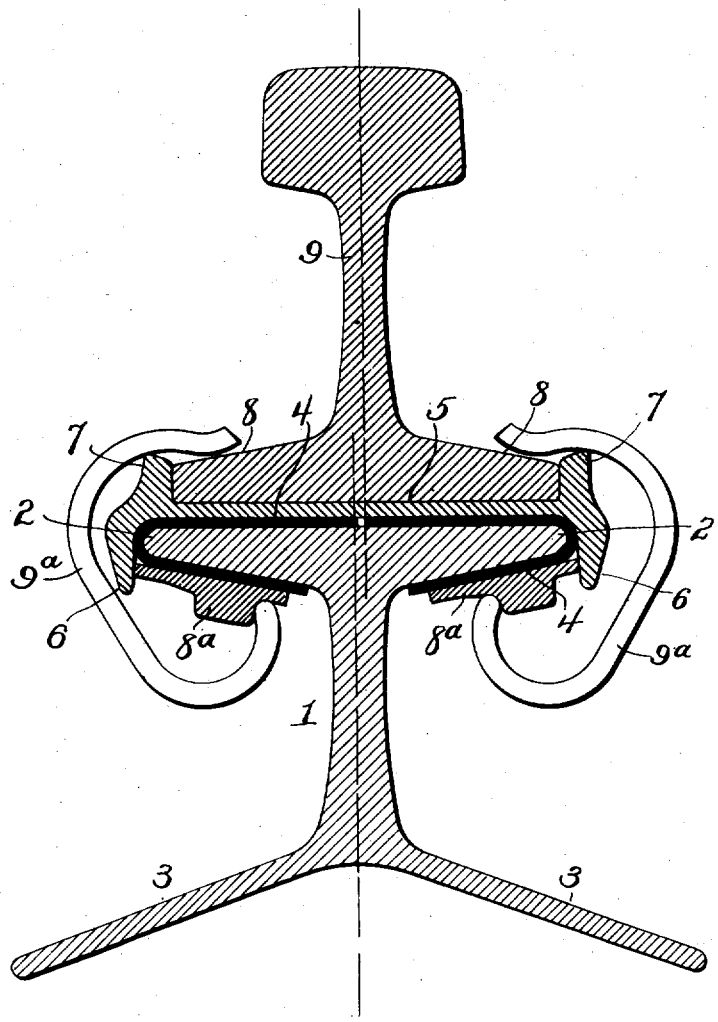
WITNESSES
E. L. Nottingham
G. F. Downing
INVENTOR
W. H. Morgan
By H. A. Seymour
Attorney
THE NORRIS PETERS CO., PHOTO-LITHO., WASHINGTON, D. C.

UNITED STATES PATENT OFFICE.

WILLIAM HENRY MORGAN, OF ALLIANCE, OHIO.

RAILROAD-TRACK CONSTRUCTION.

13,917. Specification of Reissued Letters Patent. Reissued May 11, 1915.

Original No. 1,046,837, dated December 10, 1912, Serial No. 688,064. Application for reissue filed May 13, 1913. Serial No. 767,453.

*To all whom it may concern:*

Be it known that I, WILLIAM H. MORGAN, a citizen of the United States, residing at Alliance, in the county of Stark and State of Ohio, have invented certain new and useful Improvements in Railroad-Track Construction; and I do hereby declare the following to be a full, clear, and exact description of the invention, such as will enable others skilled in the art to which it appertains to make and use the same.

My invention relates to an improvement in railroad track construction, of the type disclosed in Patent Number 1,026,107 granted to W. V. Hartzell and myself May 14, 1912. In the construction disclosed in the said application, the spring clamps or clips bear directly against, and are in contact with the base flange of the rail. In the winter, it frequently happens that the portions of the road bed exposed to the sun will thaw out, while the portion thereof shaded by trees and other objects will remain frozen. With the road bed in such condition, the track over the frozen part of the road bed will be comparatively rigid and unyielding, while the portions thereof exposed to the sun will give or yield thus permitting the ties to sink under the weight of a train, and be practically without support except for the rails, after the train has passed. On some roads it is the practice to insert shims between the ties and the rail, over the yielding portions of the track, so as to compensate for the depression of the tie, and form a support for the rail.

In the application above referred to the construction is such that the introduction of shims between the ties and rails is prevented by the spring clamps or clips which bind the rails solidly to the ties, and the object of the invention is to so construct the parts, that space will be left for the introduction of shims or wedges whereby the rails may be supported in alinement on ties that have been depressed.

The accompanying drawing is a view in cross section of a track embodying my invention.

While I do not limit the use of my invention to any particular shape or construction of metal tie, I have shown it applied to a tie having a member extending lengthwise the rail, as disclosed in the patent above referred to. This tie 1 has a top flange 2 and a base flange 3, the latter being preferably arched on its underside as shown, to form a housing within which the ballast will pack.

4 is insulating material on and underlapping the top flanges 2, and 5 is a chair resting on said insulating material. This chair is slightly wider than the top flange 2 of the tie and is provided at its side edges with the depending flanges 6, which overhang the side edges of the tie, and with upwardly projecting flanges 7, against which the side edges of the base flanges 8 of the rail 9 abut, the top flanges 7 of the chair, projecting slightly above the base flange of the rail as shown.

$8^a$ are armor plates ribbed as shown, and resting against the insulating material at the underside of the top flange of the tie, and held against outward displacement by the depending flanges 6 of the chair. These armor plates $8^a$, are held in place by the spring clamps $9^a$, which latter are shaped as shown, and are made preferably of vanadium steel, or other hard, tough and finely grained steel or iron alloy, heat treated if necessary, and of a size sufficient to withstand the strains and shocks to which they are subjected. These clamps extend up and around the side edges of the chair 5, and rest on the top of the latter with their upper ends above, but not in contact with the base flange of the rail. This leaves the rails loosely seated on the chairs, but as the resultant of the wheel pressure always falls within the base of the rail, the only pressure to which a rail is subjected, other than downward, is an outward one which is taken care of by the side flanges of the chair, hence there is, theoretically, no tendency for the rails to tip, but as the ends of the clips overlap the base flange of the rails, and are only removed therefrom a limited distance sufficient to permit of the introduction of shims, it will be seen that tipping to anything like a dangerous extent would be absolutely prevented by the ends of the clips.

It is a well known fact that where wooden ties and spikes are used, after the first train passes over it, the spikes are drawn from the wood leaving a space between the head and the rail; also where the rail is supported at intervals as with cross ties, the rails deflect at the spaces and cause a wave action.

With my construction the rail is free to move to the worm action which is not the case between the wooden ties and spikes. The track will move vertically up and down without disturbing the ties, and my construction is such as to take care of all side shear.

Engineers endeavor to keep the center of gravity of locomotives and cars loaded at such a height that the downward thrust is within the base of the rail so there is no tendency to turn the rail over. I guard against this side shear by the chair as used in my construction. By this arrangement it will be seen that if the road bed be soft in spots, it can be supported by the introduction of shims or wedges which will compensate for part, if not all, of the movement of the tie.

Having fully described my invention what I claim as new and desire to secure by Letters Patent, is:—

1. The combination of a rail, a tie, a chair located thereon and provided with upwardly projecting flanges, and a spring clip or clamp having two jaws one of which engages a fixed support on the underside of the top flange of the tie and the other rests on an upwardly projecting flange of the chair with its free end projecting over said latter flange and over but not in contact with a part resting on said chair.

2. The combination of a rail, a tie, a chair located thereon and provided with upwardly projecting flanges and a spring clip or clamp having two jaws one of which engages a fixed stop at the underside of the top flange of the tie and the other rests on an upwardly projecting flange of the chair, with its free end projecting over said latter flange and over but not in contact with the base flange of the rail.

3. The combination of a rail, a tie, a chair located thereon and provided at its sides with upwardly projecting flanges and two spring clips or clamps each having two jaws, one of which engages a fixed support on the underside of the top flange of the tie and the other rests on an upwardly projecting flange of the chair, the said clips being located on opposite sides of said chair with their free ends projecting over said latter flanges and over but not in contact with the member resting on said chair.

4. The combination of a rail, a tie, a chair located on the tie and having depending flanges overhanging the side edges of the top flange of the tie and upwardly projecting flanges forming side supports for the rail, and two spring clips or clamps each having two jaws one of which engages a fixed support on the underside of the top flange of the tie and the other rests on an upwardly projecting flange of the chair, the said clips or clamps being located on opposite sides of the chair with their free ends projecting over said latter flanges and over but not in contact with the base flange of the rail resting on said chair.

5. The combination of a metal tie and rail supporting chair separate from the tie and having depending integral flanges to engage a part of the tie, and upwardly projecting integral flanges between which the base flange of the rail rests and which form side abutments for said base flange, the rail being unconfined at the top and free to have a vertical movement between said flanges.

6. The combination of a metal tie and a chair carried by the tie but separate from the latter and provided with upwardly projecting integral side flanges between which the base flange of the rail rests, for taking side shear and maintaining the gage of the track, the rail being unconfined at the top and free to have an upward movement between the flanges of the chair.

In testimony whereof, I have signed this specification in the presence of two subscribing witnesses.

WILLIAM HENRY MORGAN.

Witnesses:

C. W. Singer,

C. E. Bertolitte.

Copies of this patent may be obtained for five cents each, by addressing the "Commissioner of Patents, Washington, D. C."